Patented Feb. 9, 1926.

1,572,540

UNITED STATES PATENT OFFICE.

ELBERT C. LATHROP, OF PHILADELPHIA, PENNSYLVANIA, AND TREADWAY B. MUNROE, OF FOREST GLEN, MARYLAND; SAID LATHROP ASSIGNOR TO THE SAID MUNROE.

METHOD OF PRESERVING FIBERS FOR PULP-MAKING PURPOSES.

No Drawing. Application filed June 20, 1924. Serial No. 721,365.

*To all whom it may concern:*

Be it known that we, ELBERT C. LATHROP and TREADWAY B. MUNROE, citizens of the United States, and residing, respectively, at Philadelphia, in the county of Philadelphia and State of Pennsylvania, and Forest Glen, in the county of Montgomery and State of Maryland, have invented certain new and useful Improvements in Methods of Preserving Fibers for Pulp-Making Purposes; and we do hereby declare the following to be a full, clear, and exact description of the invention, such as will enable others skilled in the art to which it appertains to make and use the same.

This invention relates to a method of preserving bagasse and analogous fibers for pulp making purposes and has for its object to improve the procedures which have been heretofore proposed.

With this and other objects in view, the invention consists in the novel steps and combinations of steps constituting the process, all as will be more fully hereinafter disclosed and particularly pointed out in the claims.

In order that the invention may be the more clearly understood, it is said:—As is well known, bagasse fibers as they leave the sugar cane mill contain varying, but small amounts of unextracted sugar, together with carbohydrate gums not easily soluble in water. The water content of an ordinary mass of bagasse is substantially 50 per cent, depending on the particular operations to which it was subjected at the mill. If the bagasse was immediately dried after leaving the mill, very little, if any, change in the mass is later brought about by fermentation, since it is well known that micro-organisms giving rise to fermentations require water in order to grow and carry on their processes of metabolism known as fermentations. Such drying is however found to be too costly for commercial purposes and cheaper means have been sought to accomplish the preservation of the fibers. When masses of bagasse containing moisture upon leaving the mill, are piled, or are baled and exposed to the elements, under conditions of uncontrolled open storage, a series of fermentations usually takes place, depending on the chance amount of moisture, the temperature, the oxygen supply and the hydrogen ion concentration to which said masses are subjected. These fermentations are of several kinds, but in general they result in a weakening or a deterioration of the fiber, and other values in the mass of bagasses, or to an actual partial or total loss of such constituents, if permitted to proceed uncontrolled for any length of time.

The first type of fermentation usually sets in within a day or a few days after the bagasse leaves the mill and consists in the alcoholic and lower fatty acid fermentation of the sugars and the gums present. This fermentation while it causes a generation of heat, it not substantially injurious to the fibers and the values of the bagasse remain substantially unchanged. This said alcoholic fermentation, however, is followed by other fermentations that are brought about by certain molds and fungi and these latter if left uncontrolled cause a genuine deterioration of the bagasse fibers.

It has been discovered in this invention, however, that the type of fermentation that follows alcoholic fermentation may be controlled by the wetting of the piled mass of bagasse or the baled bagasse to such an extent that the mass becomes wet substantially through and through, or until its water holding capacity of about 90 per cent to 100 per cent is reached. It is necessary in this wetting operation to substantially fill up the air spaces in the pile or in the bale so that the oxygen supply from the air is materially lowered. By this water treatment, the growth in the bagasse of substantially all molds is inhibited, and a bacterial fermentation sets up, which may be termed "bacterial pickling". In such case, acids such as lactic acid, and other acids of a fatty or fatty hydroxylated type are produced by the action of the bacteria upon the parenchymatious matter of the bagasse, but substantially no objectionable action on the fiber itself takes place. A characteristic of this desirable fermentation is the sticky feel of the mass which is noticeable a few days to a few weeks after the wetting has taken place.

Another characteristic of this said bacterial fermentation is the putrid odor given off by the mass during the early stages of storage, and which odor on long storage diminishes or disappears. This said bacterial pickling is not to be confused with the well known ensilage fermentation which is of a sweet or pleasant odor, and which is substantially anaerobic in character. Because of the addition of water in large volumes in the beginning, and because of the thorough wetting down of the mass, the rise of temperature to a point of pasteurization is prevented.

It is found necessary to keep the mass of bagasse wet to approximately its water holding capacity, or above, for otherwise in the drier portions of the mass, molds and fungi will grow, and by their fermenting action they will exert a deleterious action on the bagasse fibers themselves.

Although it is to be understood that this invention may be carried out other ways without departing from the spirit thereof, one way in which it is performed is as follows:—

The bagasse as it comes from the mill is moved in a suitable manner as by cars, conveyors, etc., to the point of storage and piled in loose piles on suitably prepared ground. As the bagasse mass is laid down, in layer upon layer, it is thoroughly wetted by a hose or by other suitable means. The mass is kept in this wetted condition by the addition of more water from time to time until it is ready for the usual cooking operation preparatory to manufacturing the same into the desired pulp. When treated in the manner above disclosed the fibers will be found to have undergone substantially no deterioration as to their strength and pulp making qualities, nor under such conditions of storage will the mass heat up to an objectionable extent.

From the foregoing, it will now be clear that by supplying sufficient water to the bagasse in storage as will keep the mass wet to substantially its water holding capacity and thereby materially lessening the amount of air present, the growths of objectionable masses, fungi, etc., are prevented, while a bacterial fermentation of a lactic acid producing character is brought about, which destroys the parenchymatious matter binding the bagasse fibers into bundles of fibers. The destruction of this said parenchymatious matter frees the fibers from their bundles to a great extent without injuring the fibers, and therefore prepares them for the subsequent cooking action, which latter may in consequence be a mild one.

It is obvious that the foregoing procedure is not limited to bagasse fibers, for other analogous fibers such as those of bamboo, of cornstalks, of rice straw, etc., may be similarly preserved against destructive fermentation and prepared for cooking or other desired operations. Therefore, it is not desired to be limited to the foregoing disclosure except as may be required by the claims.

What is claimed is:—

1. The process of preserving bagasse and analogous fibers from injurious fermentations during storage which consists in wetting a mass of said fibers to approximately its water holding capacity, and keeping said mass sufficiently wet to prevent the growth of undesirable molds and fungi, while a fermentation of the lactic acid producing type proceeds throughout said mass.

2. The process of preserving green bagasse and analogous fibers from injurious fermentations during storage which consists in wetting a mass of said fibers to substantially its water holding capacity to inhibit the growth of molds and fungi and to promote the growth of lactic acid producing and similar bacteria; and keeping said mass sufficiently wet to maintain a fermentation by said last named bacteria until a desired proportion of the parenchymatious matter present is destroyed.

3. The process of preserving bagasse fibers during storage from injurious fermentations, which consists in maintaining said fibers in a condition too wet to permit said injurious fermentations, but sufficiently wet to promote a desired lactic acid type of fermentation, and for a time sufficient to prepare said fibers for a cooking operation.

In testimony whereof we affix our signatures.

ELBERT C. LATHROP.
TREADWAY B. MUNROE.